(12) United States Patent
Delos Ayllon et al.

(10) Patent No.: US 9,526,140 B2
(45) Date of Patent: Dec. 20, 2016

(54) COMPACT DRIVER FOR A LIGHT EMITTING DIODE HAVING AN AUXILIARY OUTPUT

(71) Applicant: PHILIPS LIGHTING HOLDING B.V., Eindhoven (NL)

(72) Inventors: Julia Delos Ayllon, Eindhoven (NL); Toni Lopez, Eindhoven (NL); Machiel Antonius Martinus Hendrix, Eindhoven (NL); Eduardo-Jose Alarcon-Cot, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 15/023,242

(22) PCT Filed: Sep. 18, 2014

(86) PCT No.: PCT/IB2014/064626
§ 371 (c)(1),
(2) Date: Mar. 18, 2016

(87) PCT Pub. No.: WO2015/040564
PCT Pub. Date: Mar. 26, 2015

(65) Prior Publication Data
US 2016/0234901 A1    Aug. 11, 2016

(30) Foreign Application Priority Data

Sep. 19, 2013  (EP) .................................... 13185185
Sep. 19, 2013  (EP) .................................... 13185189

(51) Int. Cl.
*H05B 37/02*   (2006.01)
*H02M 3/07*    (2006.01)
*H05B 33/08*   (2006.01)

(52) U.S. Cl.
CPC .......... *H05B 33/0845* (2013.01); *H02M 3/07* (2013.01); *H05B 33/0815* (2013.01)

(58) Field of Classification Search
CPC ............ G05F 1/468; H02M 1/10; H02M 3/07; H02M 3/158; H02M 3/18; H02J 1/102; H03F 1/0227; H03F 1/26; H05B 37/02; H05B 33/08
(Continued)

(56) References Cited

U.S. PATENT DOCUMENTS 6,522,558 B2   2/2003  Henry
6,812,776 B2   11/2004 Henry
(Continued)

FOREIGN PATENT DOCUMENTS

WO   WO2013086445   6/2013

OTHER PUBLICATIONS

Kumar, et al., "Novel Switched Capacitor Based Triple Output Fixed Ratio Converter (TOFRC)", IEEE, 2002, pp. 2352-2356.

*Primary Examiner* — Jimmy Vu (57) ABSTRACT

The current invention relates to a driver (10,20) for driving at least one main load and one auxiliary load comprising: a power converter (101) adapted to convert an input voltage (Vin) into at least one main output voltage provided through a main output (1011) for driving said main load, and at least one auxiliary output DC voltage through an auxiliary output (1013) for supplying said auxiliary load, a controller (103) adapted to control the main output based on at least one input set point, wherein the power converter (101) comprises a switched capacitor converter comprising a plurality of switches and a plurality of capacitors, the main output (1011) being connected to at least one internal node of the power converter (101), the auxiliary output (1013) being connected to a DC node of the power converter (101).

11 Claims, 6 Drawing Sheets

(58) Field of Classification Search
USPC .... 315/209 R, 224–226, 291–297, 307, 308, 315/312; 363/59, 60; 323/265, 273, 282, 323/351
See application file for complete search history.

(56) References Cited

U.S. PATENT DOCUMENTS

| | | | |
|---|---|---|---|
| 7,368,977 B2 | 5/2008 | Wei et al. | |
| 7,696,735 B2 | 4/2010 | Oraw et al. | |
| 8,259,476 B2 * | 9/2012 | Ben-Yaakov | H02M 3/07 363/60 |
| 2002/0067143 A1 | 6/2002 | Robinett et al. | |
| 2006/0238465 A1 | 10/2006 | Kurumisawa | |
| 2006/0262574 A1 | 11/2006 | Kelly | |
| 2008/0239772 A1 | 10/2008 | Oraw et al. | |
| 2010/0033109 A1 | 2/2010 | Liu et al. | |
| 2012/0206946 A1 | 8/2012 | Sagneri et al. | |
| 2013/0154482 A1 | 6/2013 | Ge et al. | |

* cited by examiner

FIGURE 6B

COMPACT DRIVER FOR A LIGHT EMITTING DIODE HAVING AN AUXILIARY OUTPUT

CROSS-REFERENCE TO PRIOR APPLICATIONS

This application is the U.S. National Phase application under 35 U.S.C. §371 of International Application No. PCT/IB2014/064626, filed on Sep. 18, 2014, which claims the benefit of European Applications Nos. 13185185.9 and 13185189.1, both filed on Sep. 19, 2013. These applications are hereby incorporated by reference herein.

TECHNICAL FIELD

The current invention relates to the field of integrated power converters. The current invention can notably apply to drive circuits for light emitting devices such as Light Emitting Diodes (LED) light sources, but can also apply to other types of loads. More specifically, the current invention relates to a compact and efficient power conversion device.

BACKGROUND

Applications requiring a high level of integration of power conversion modules, for example using Switched Mode Power Supplies (SMPS), can resort to power converters such as Switched Capacitor Converters (SCC), which can provide highly efficient DC-to-DC voltage conversion with only the use of capacitors and switches, possibly combined with miniaturized inductive output filters.

Notably, the Solid State Lighting (SSL) Industry's demand for small and compact power management units for LEDs is increasing. LEDs require that power be delivered in the form of a constant current, as efficiently as possible. Ideally, LED drivers comparable in size to the LEDs themselves would represent a significant breakthrough enabling new lighting concepts. Such a solution will require a system with a high level of reliability and efficiency, in order to fit the requirements of life-time, size and heat dissipation.

LED drivers can be based on Switched Mode Power Supplies (SMPS). Notably, some LED drivers can comprise hybrid power converters combining SCCs with inductive SMPS. Recently, LED lamps commonly designated as "smart lamps", have been developed. Smart lamps typically require drivers having dimmable outputs that provide current control dimmability for supplying the LEDs, as well as providing an auxiliary voltage to supply electronic modules. The electronic modules provide basic lamp control, but can also provide other advanced functionalities such as wireless communication, color dimming, or black bodyline dimming for instance.

According to known solutions, an auxiliary output can be derived from a secondary winding of a transformer, for example by tapping or by using an additional winding. According to other known solutions, a controller, for example implemented in an integrated circuit, are designed to output an auxiliary low voltage by means of dedicated sub-circuits.

However the existing state-of-the art still lacks LED drivers that would integrate in a compact, efficient and optimized manner all the complex requirements in terms of multi-output power management.

The exemplary embodiments described in the current patent application relate to main loads formed by lighting units such as LEDs, but it shall be understood that the current invention can equally apply to other types of linear or non-linear loads, such as CPUs, for instance in mobile device applications, or any type of load requiring output current control and/or a large dynamic range with auxiliary output voltage needs.

SUMMARY

One aim of the present invention is to remedy the above-mentioned shortcomings of the known solutions, by proposing a compact and integrated solution allowing power management through one single power conversion module that further provides an auxiliary output through which a DC output voltage can be delivered.

According to the present invention, a driver arrangement is proposed, that is based on a SCC architecture, or a hybrid architecture of a SCC in combination with inductors, exploiting the intrinsic characteristics of a SCC.

For that purpose, the current invention proposes a novel driver for driving at least one main load and one auxiliary load comprising a power converter adapted to convert an input voltage into at least one main output voltage provided through a main output for driving said main load, and at least one auxiliary output DC voltage through an auxiliary output for supplying said auxiliary load, a controller adapted to control the main output based on at least one input set point, wherein the power converter comprises a switched capacitor converter comprising a plurality of switches and a plurality of capacitors, the main output being connected to at least one internal node of the power converter, the auxiliary output being connected to a DC node of the power converter. The principle of this invention is based on the fact that if a switched capacitor converter structure is used in such a way that power is withdrawn from the floating nodes thereof, then some DC node of the same SCC structure can be used for supplying an auxiliary load with power.

In an exemplary embodiment of the invention, the main output of the power converter can convey a floating voltage having a level that is a fraction of the input voltage level related to the conversion ratio, with a bias component split in a plurality of steps ranging from a determined lowest fraction level to a determined highest fraction level.

In another embodiment, the power converter can be configured for providing a plurality of output signals having a level that is a fraction of the input voltage level, each output signal being floating with a bias component split in a plurality of steps ranging from a determined lowest fraction level to a determined highest fraction level, the driver further comprising a selection module adapted to select one output signal among said plurality of output signals and to output such selected output signal.

The driver can further comprise an output filter connected to the main output of the power converter.

In other embodiments, the output filter can be connected to the output of the selection module.

The power converter can be based on at least one topology in the group consisting of Dickson ladder, standard ladder, Fibonacci, and series-parallel topologies.

The driver can further comprise a regulation module coupled to auxiliary output for regulating the auxiliary output voltage.

The regulation module can comprise a regulation controller comprising an input conveying a signal representing a sensed voltage across the auxiliary load, and at least one output conveying control signals for controlling the switches of the power converter that allow charging the DC node capacitor of the power converter, said control signals being generated by the regulation controller.

The regulation module can comprise a linear regulator connected in series between the DC node of the power converter and the auxiliary load.

Another aspect of the invention is a lighting system comprising a driver as in any of the described embodiments, a main load and an auxiliary load, wherein the main load comprises at least one Light Emitting Device (LED) and/or the auxiliary load comprises at least one among a group consisting of a control unit, a communication unit and a sensor unit.

Another aspect of the invention is a method for supplying a main load with a Pulse Width Modulation (PWM) signal through an inductive output filter having at least an output configured to be connected to the main load, comprising at least a step of converting the power supplied by a DC input voltage into at least a main output voltage having a level amplitude that is a fraction of the input voltage level with a bias component to supply the main load supply signal through the output filter, and supplying an auxiliary load with an auxiliary DC output voltage.

BRIEF DESCRIPTION OF THE DRAWINGS

These and other characteristics and advantages of the invention will be made clearer in view of the detailed description given below of preferred embodiments, provided by way of an illustrative and non-limiting example only, as well as the accompanying drawings which represent.

DETAILED DESCRIPTION

In the following detailed description, for purposes of explanation and not limitation, representative embodiments disclosing specific details are set forth in order to provide a thorough understanding of the present disclosure. However, it will be apparent to one having ordinary skill in the art having had the benefit of the present disclosure that other embodiments according to the present disclosure that depart from the specific details disclosed herein remain within the scope of the appended claims. Moreover, descriptions of well-known apparatuses and methods may be omitted so as to not obscure the description of the representative embodiments. Such methods and apparatuses are clearly within the scope of the present disclosure.

Figure 1:
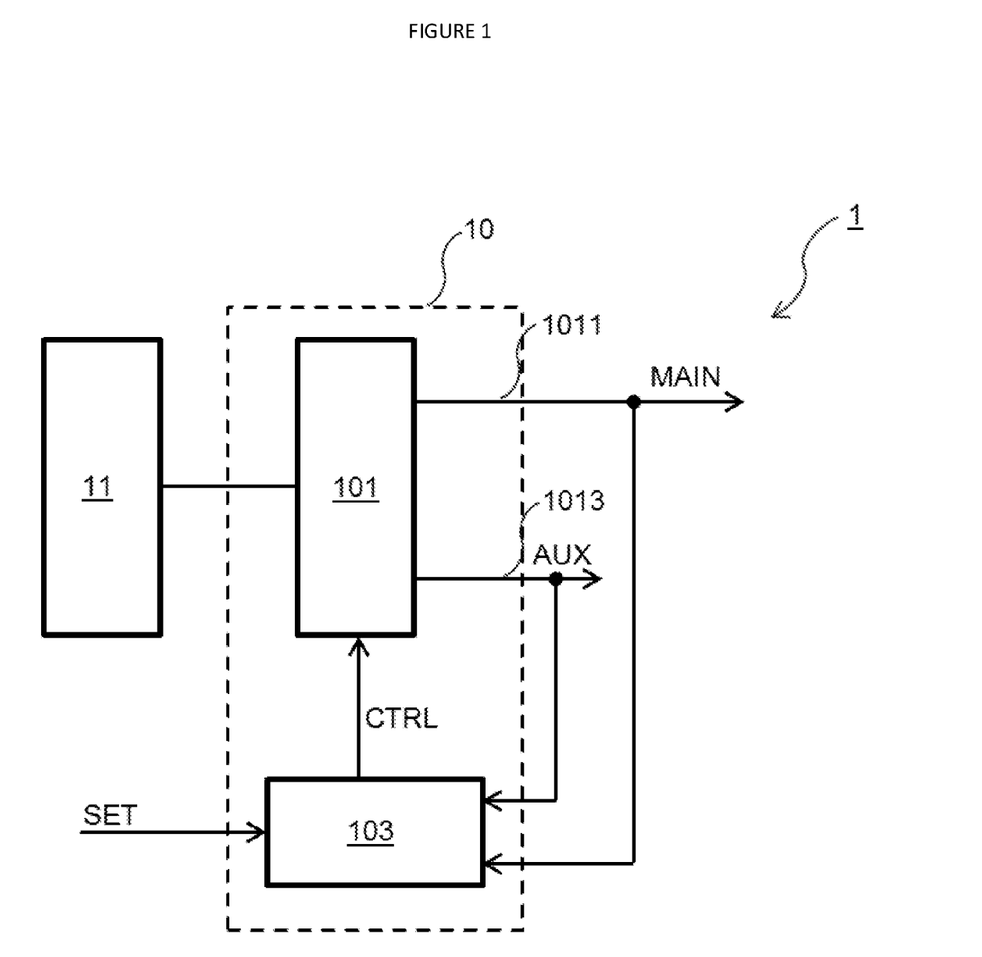
FIG. 1, a block diagram illustrating a LED driver with an auxiliary output, according to the invention.

FIG. 1 shows a generic block diagram illustrating a LED driver with an auxiliary output, according to the invention. FIG. 1 depicts a LED driver 10 connected to a power supply 11. The LED driver 10 comprises a power converter 101 that comprises one main output 1011 (MAIN) and one auxiliary output 1013 (AUX). The main output 1011 can be connected to a main load, for example a LED or a set of LEDs, not shown in FIG. 1, or any other type of load. The main output 1011 can possibly be connected to the main load through a main output filter as described further below in reference to FIG. 2.

The auxiliary output 1013 can be connected to an auxiliary load, not shown in FIG. 1, which can comprise a control unit adapted to control operation of the LED, or a communication unit, or a sensor unit comprising one or more sensors, an active cooling unit, etc., or a combination of said elements. The auxiliary output 1013 can possibly be connected to the auxiliary load through an auxiliary output filter. The LED driver 10, the power supply 11, the main load and auxiliary load, the filters or part of these elements, can be elements of a lighting system 1, which also is an aspect of the current invention.

The power supply 11 can for example be designed to supply a AC or DC voltage Vsupply. For example, the supply voltage Vsupply can be an AC voltage from mains, or a DC voltage supplied by a DC grid or a battery.

The LED driver 10 further comprises a controller 103. The controller 103 comprises at least one input (SET) for receiving at least one set point control signal, and comprises at least one output (CTRL) for delivering at least one control signal, to at least the power converter 101.

The controller 103 can further comprise one main feedback input for receiving feedback signals representative of the actual operation of the main load, and/or one auxiliary feedback input for receiving feedback signals representative of the actual operation of the auxiliary load. For example the main feedback input can convey a signal that is representative of a sensed current through an LED if the main load is formed by an LED, and the auxiliary feedback input can convey a signal providing information sensed by a set of sensors, if the auxiliary load is formed by a sensing unit comprising sensors. The controller 103 can thus adjust operating parameters of the power converter 103 as a function of input set point values, and/or feedback signals representative of the operation of the main load and/or auxiliary load.

The power converter 101 is adapted to accept the supply voltage Vsupply and to deliver a main regulated voltage through the main output, and an auxiliary DC voltage through the auxiliary output.

According to a specificity of the current invention, it is proposed that the power converter 101 is formed by a Switched Capacitor Converter (SCC), comprising a plurality of switches controlled by control signals, and a plurality of capacitors, and that the main output 1011 of power converter 101 is directly connected to either one of the internal nodes of the switched capacitor converter, while the auxiliary output 1013 of the power converter 101 is directly connected to a DC node of the SCC. The SCC can be controllable, a controllable SCC typically comprises a plurality of internal nodes, some of which being used as outputs in the current invention.

Notably, a controllable SCC typically comprises at least one DC node, providing a voltage that has a fixed value that is independent of the duty cycle, some other internal nodes being floating PWM nodes, providing a pulsating voltage that can be modulated by varying the duty cycle. The two outputs of the power converter 101 can thus be controlled separately, by means of a single controller 103, through a switched capacitor converter, which offers the advantage of requiring a simple and compact architecture. The small voltage ripple at the floating PWM nodes notably provides the advantage of alleviating the requirements on the output filters; if an inductive output filter is used, then the size of the inductor can hence be dramatically reduced. In the exemplary embodiments described in FIG. 2 described in detail below, an inductor having an inductance below 1 pH can be used as an output filter inductance.

The SCC can also be controlled through frequency modulation and/or on-channel resistance modulation. For example, the internal nodes of the SCC can be controlled through varying the duty cycle of a control signal without any impact to the DC node. The DC node can be regulated through ON-channel modulation without a noticeable impact to the voltages at the internal nodes of the SCC.

All the control techniques mentioned above can be used thanks to adequate dimensioning of the capacitors in the SCC structure.

Figure 2:
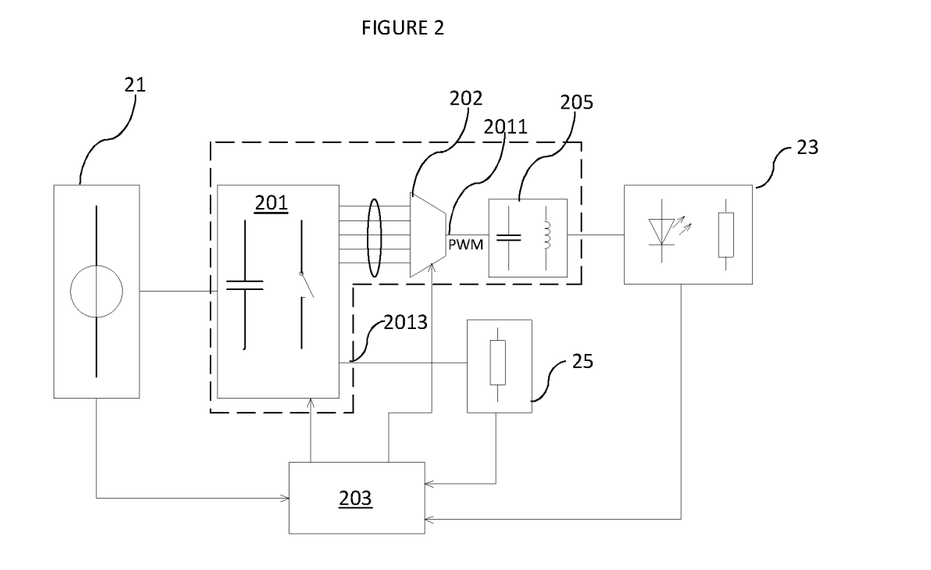
FIG. 2, a block diagram illustrating a LED driver with an auxiliary output, according to an exemplary embodiment of the invention.

FIG. 2 shows a block diagram illustrating a LED driver with an auxiliary output, according to an exemplary embodiment of the invention.

In the exemplary embodiment of the invention illustrated by FIG. 2, a driver 20 comprises a power converter 201 that comprises a SCC, in a way similar as the driver 10 described above in reference to FIG. 1. The power converter 201 is supplied with power by a voltage supply 21, also in a way similar as the driver 10 described above in reference to FIG. 1. The driver 20 has a main output connected to a main load 23, which can for example be a resistive load, or a light emitting device such as an LED or an Organic Light Emitting Diode (OLED), and an auxiliary output connected to an auxiliary load 25.

In the non-limiting exemplary embodiment illustrated by FIG. 2, the power converter 201 comprises a plurality of outputs delivering PWM voltages. As described above, the plurality of outputs are directly connected to the internal nodes of the SCC comprised by the power converter 201, as described further in detail below in reference to FIG. 3. Still in this exemplary embodiment, one of the plurality of outputs of the power converter 201 can be selected by means of adequate selection means, such as a selection module, and connected to an output, for example through an output filter 205. For example, the plurality of outputs of the power converter 201 can be connected to a plurality of respective inputs of a multiplexer module 202 forming the selection module, which delivers at its output one PWM voltage PWMx from said plurality of inputs as detailed further below. The multiplexer module 202 can thus be a n:1 multiplexer. It shall be understood that the driver does not necessarily comprise a multiplexer as in the illustrated exemplary embodiment. The selection module can for example be formed by an adequate wiring of one of the outputs of the power converter 201 to the output of the driver 20, possibly through the output filter 205.

The output of the multiplexer 202 is connected to the output filter 205. The output filter 205 can notably comprise at minimum either one capacitor or one inductor.

Still in the illustrated exemplary embodiment, the auxiliary output of the driver 20 is directly connected to the auxiliary output 2013 of the power converter 201, which is directly connected to one DC node of the SCC that is comprised in the power converter 201, as described further in detail below in reference to FIG. 3.

The driver 20 further comprises a controller 203 in a way similar as the driver 10 described above in reference to FIG. 1. The controller 203 allows a control loop by controlling the power converter 101 and the multiplexer 202 as a function of input signals representative of a sensed voltage supplied by the power supply 21, and/or a signal representative of a sensed voltage, current or power of the main load 23 and/or the auxiliary load 25, for example a load voltage.

One first output of the controller 203 allows controlling the power converter 201 and one second output of the controller 103 allows controlling the multiplexer 202 channel, for example by means of a zonal control.

The controller 203 comprises a SCC; thus, the controller 203 controls the power converter 201 through its first output, by controlling the duty cycle and/or the frequency of the power converter 201 by means of an analog control.

Figure 3:
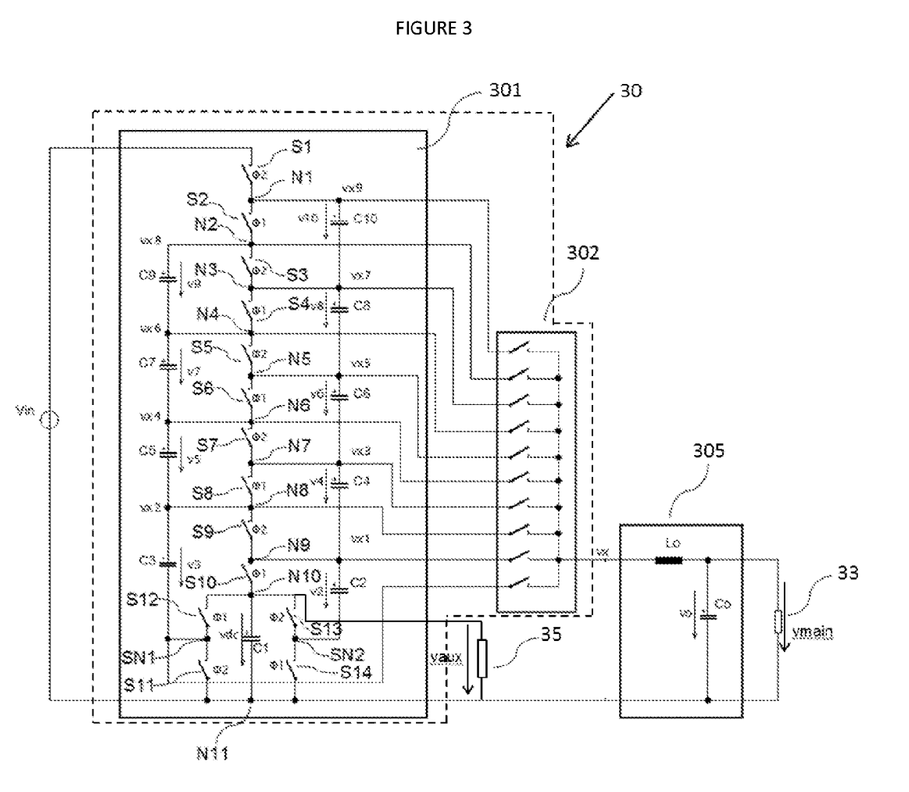
FIG. 3, an electrical diagram illustrating a LED driver with an auxiliary output, according to an exemplary embodiment of the invention.

FIG. 3 shows an electrical diagram illustrating a LED driver with an auxiliary output, according to an exemplary embodiment of the invention.

A driver 30, in a way similar as the driver 10 or 20 described above, notably comprises a power converter 301, a multiplexer 302 and an output filter 305.

In the non-limiting exemplary embodiment illustrated by FIG. 3, the power converter 301 is adapted to provide a plurality of PWM output signals as mentioned above, having a level that is a fraction of the input DC voltage Vin. In this exemplary embodiment the PWM output signals are square-waveform voltages with a level that is a fraction of the input DC voltage Vin. Each of the square-wave voltages is floating with a bias component equally split, in the non-limiting illustrated exemplary embodiment, in a plurality of steps ranging from the lowest fraction level to the highest fraction level. Any of the voltages can be selected by means of the multiplexer 302 and can be output through an output of the multiplexer 302, the output of the multiplexer 302 being connected to the output filter 305, thus providing a continuous voltage to the main load 33.

In the non-limiting exemplary embodiment illustrated by FIG. 3, the power converter 301 is formed by a SCC comprising a plurality of switches and capacitors. For example, the power converter 301 comprises a so-called Dickson Ladder converter. It shall be observed that other SCC topologies can be used, such as standard ladder, Fibonacci, or series-parallel topologies for instance.

The illustrated non-limiting exemplary embodiment more specifically uses a Dickson Ladder topology based on ten capacitors C1 to C10 and fourteen switches S1 to S14 of the single pole, single throw type. More specifically, the power converter 301 comprises two flying ladders: one first flying ladder comprises four capacitors C3, C5, C7, C9 put in series, and one second flying ladder comprises five capacitors C2, C4, C6, C8, C10 put in series.

The power converter 301 further comprises ten central nodes N1 to N10. One first switch S1 selectively connects the first central node N1 to the supply voltage Vin. One second switch S2 selectively connects the first central node N1 to the second central node N2. One third switch S3 selectively connects the second central node N2 to the third central node N3. One fourth switch S4 selectively connects the third central node N3 to the fourth central node N4. One fifth switch S5 selectively connects the fourth central node N4 to the fifth central node N5. One sixth switch S6 selectively connects the fifth central node N5 to the sixth central node N6. One seventh switch S7 selectively connects the sixth central node N6 to the seventh central node N7. One eighth switch S8 selectively connects the seventh central node N7 to the eighth central node N8. One ninth switch S9 selectively connects the eighth central node N8 to the ninth central node N9. One tenth switch S10 selectively connects the ninth central node N9 to the tenth central node N10. One first capacitor C1 is placed between the tenth central node N10 and one eleventh central node N11 that is connected to a reference voltage, for example to the ground.

The first flying ladder comprising the four capacitors C3, C5, C7, C9 is located between the second central node N2 and one first secondary node SN1. One eleventh switch S11 selectively connects the first secondary node SN1 to the eleventh central node N11; one twelfth switch S12 selectively connects the first secondary node SN1 to the tenth central node N10.

The second flying ladder comprising the five capacitors C2, C4, C6, C8, C10 is located between the first central node N1 and one second secondary node SN2. One thirteenth switch S13 selectively connects the second secondary node SN2 to the tenth central node N10; one fourteenth switch S14 selectively connects the second secondary node SN2 to the eleventh central node N11.

The two flying ladders are oppositely phased, thanks to an adequate sequence of opening and closing the switches S1 to S14. For example, all the even-numbered switches S2, S4, ..., S14 can be in a given state during a first time phase φ1, for instance turned on, while all the odd-numbered switches S1, S3, ..., S13 can be in the opposite, for instance turned off; during a successive second time phase φ2, the states of all the switches can be reversed.

The power converter 301 as per the illustrated embodiment is thus configured so as to provide a conversion ratio of 10:1. The signals delivered from the central nodes N1 to N9 form as many outputs of the power converter 301, and are the internal nodes of the switched capacitor converter forming the power converter 301 in the illustrated embodiment, designated as voltages vx1 to vx9 in FIG. 3, are connected to as many inputs of the multiplexer 302. In this exemplary embodiment, the multiplexer 302 thus comprises nine switches, allowing selectively connecting one of the nine inputs to an output vx, and comprises an additional switch connected to the first secondary node SN1 for a further improved definition or dynamics of the voltage level applied to the output filter 305. More generally, the multiplexer 302 can be connected to any of the internal nodes of the power converter 301, and comprises as many switches as internal nodes to which it is connected. The structure of the multiplexer 302 can be simplified through reducing the number of switches, depending on the requirements with regards to the load operation.

As described above, the multiplexer 302 is a possible implementation of a selection module. An even simpler architecture can be realized by providing an adequate wiring of a chosen output among the plurality of outputs of the power converter 301, which may satisfy the operating requirements of the load for some applications. In such a case, the selection module is formed by said adequate wiring, i.e. that there is no need in such an embodiment to resort to any multiplexer. Such an embodiment notably brings the advantage of still providing a cost-efficient and compact architecture that can be adapted to a given load for example through a simple additional step of wiring in a manufacturing process.

In the exemplary embodiment illustrated by FIG. 3, the DC node of the power converter 301 is the tenth central node N10. Thus, the auxiliary output of the power converter 301, which can also be the auxiliary output of the driver 30, can be directly connected to the tenth central node N10 as in the exemplary embodiment illustrated by FIG. 3. The DC voltage across the secondary load 35, which can be designated as Vaux, is in this case the voltage across the first capacitor C1, i.e. the voltage between the tenth central node N10 and the eleventh central node N11, designated as vaux.

As in the exemplary embodiment illustrated by FIG. 3, the switched capacitor converter can be implemented with a 10-capacitor Dickson Ladder topology with a fixed conversion ratio of 10:1 accessible from the output voltage vaux of the power conversion module 101.

Simultaneously, the voltages vx1 to vx9 at the internal nodes of the switched capacitor converter forming the power converter 301, are square-waveform voltages with a magnitude of a twentieth of the input DC voltage Vin. Each of the central nodes N1 to N9 produce the square-wave voltage floating with a bias component equally split in 10 steps ranging from $$\frac{Vin}{20} \text{ to } Vin \cdot \frac{19}{20},$$

as illustrated in FIG. 3, described further in details below. Any of the central nodes N1 to N9 can be connected to the output filter 305 through the multiplexer 302.

In the exemplary embodiment of the invention illustrated by FIG. 3, using a SCC as the power converter 301 allows providing the output voltages of the power converter 301 through the already existing internal nodes of the SCC and the DC node thereof. This specific embodiment offers the advantage of allowing significantly lowering the number of capacitors used in the power conversion device, in comparison with existing power conversion devices having similar performances, as the output voltages are already available at nodes that are intrinsically comprised in the SCC forming the power converter 301.

As in the exemplary embodiment illustrated by FIG. 3, the output filter 305 can comprise a filter inductance Lo and a filter capacitor Co, the filter inductance Lo being connected between the output of the multiplexer 302 and the main load 33 in parallel with the filter capacitor Co.

A further advantage of the current invention is that the ripple of the voltage vx signal at the output of the multiplexer 302 is dramatically lowered, which allows alleviating the requirements for the filter inductance Lo, in terms of bulk, in such a way that the inductance Lo can be easily integrated in a small package, with a size that is similar to the size of the main load 33 itself, for example formed by a LED module. Typically, an inductance value is directly proportional to the voltage ripple, therefore if the voltage ripple is reduced by a factor N, then the volume of the inductor can be reduced by the same factor N.

Such small ripples also provide the advantage of allowing reducing the electromagnetic emissions, therefore improving ElectroMagnetic Interference (EMI). They also provide the further advantage that voltage and current stresses in the switches comprised in the power conversion device can be dramatically reduced, therefore notably improving life-time of the power conversion device.

In order to achieve load regulation, the controller 203, as described above in reference to FIG. 2, is configured to control the appropriate channel of the multiplexer 302 and to control the power converter 301. The multiplexer 302 provides a coarse control with discrete voltage levels applied to the output filter 305.

The controller 203 further provides fine control PWM of the square-waves of the outputs of the power converter 301, i.e. the internal nodes of a SCC in the exemplary embodiment described above in reference to FIG. 3, by controlling the duty cycle of the SCC phases. Furthermore, the controller 203 can allow adjusting the switching frequency of the SCC so as to maximize the efficiency at different load levels.

While the internal nodes of the SCC have PWM voltages, the DC node of the SCC has a voltage with a fixed value determined by the input voltage Vin times the conversion ratio of the power converter 301.

Figure 4:
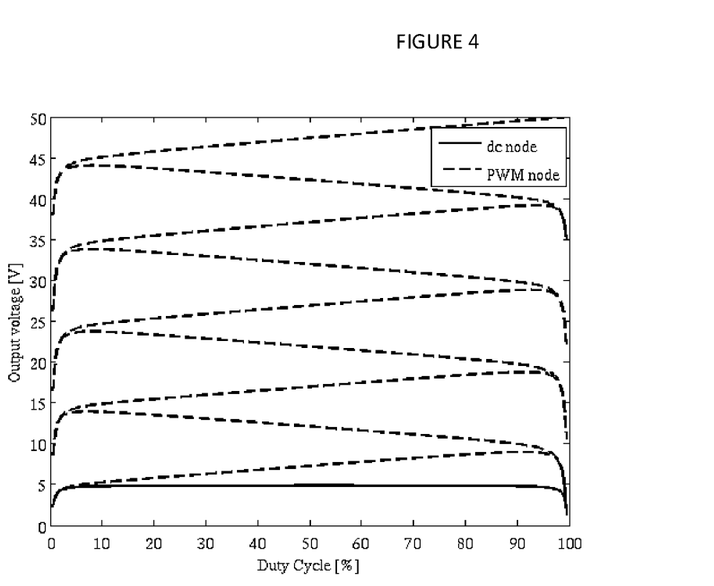
FIG. 4, diagrams illustrating an example of the output voltages at the main output and auxiliary output of a LED driver according to the invention.

The variations of the average voltage level of some of the internal nodes of a SCC and of the DC node thereof as depicted in FIG. 3 versus a sweep of the duty cycle are illustrated in FIG. 4, described in further details below.

FIG. 4 shows diagrams illustrating an example of the output voltages at the main output and auxiliary output of a LED driver according to the exemplary embodiment described above in reference to FIG. 3.

FIG. 4 shows curves illustrating the average voltages at different internal nodes of a power converter 301 and at the DC node thereof, in an exemplary embodiment wherein the input voltage Vin is in the order of 50 Volts, when the duty cycle of a PWM signal controlling the switches of the SCC is swept from 0 to 100%.

As can be seen in FIG. 4, the average voltages of some internal nodes may overlap for extreme values of the duty cycle.

In FIG. 4, nine curves depicted in dotted lines represent, from the top to the bottom of the diagram, the voltages respectively at the first nine internal nodes N1 to N9 of the SCC, as a function of the duty cycle of the control PWM signal.

As shown in FIG. 4, varying the duty cycle of the signal controlling the switches of the power converter 301, by means of the controller 303 as described above in reference to FIG. 1, is a way to allow achieving a continuous range of output voltage values; furthermore, selecting an appropriate output voltage by means of multiplexer 302 allows achieving a wide range of output voltage values.

The bottom curve, depicted as an unbroken line in the diagram of FIG. 4, represent the voltage at the DC node N10 of the SCC. As can be seen from this curve, and as described above in reference to FIG. 3, the voltage at the DC node has a fixed value that is determined by the input voltage Vin times the conversion ratio of the converter, which equals 10 in the non-limiting exemplary embodiment illustrated by FIG. 3. This conversion ratio is fixed, and does not depend on the duty cycle operation of the SCC. This voltage can be used for providing the auxiliary output of the power converter 301, which can also be the auxiliary output of the driver 30. In cases where the input voltage is high, as in the illustrated example wherein the input voltage equals 50 V, then the intrinsic high conversion ratio provided by the SCC architecture of the power converter 301, between the input voltage and the auxiliary output voltage, can be advantageous in comparison with other known solutions, notably in terms of simplicity and efficiency.

In some cases, the auxiliary output may require a tight regulation. In an embodiment of the invention, the driver can comprise a regulation module. The regulation module can for example be a linear regulator. Thus, the driver is adapted to provide a voltage that is slightly above the voltage that is required by the auxiliary load; for instance: for a 3.3-V electronic module as the auxiliary load, the auxiliary output can be adapted to provide a voltage in the range between 3.5 and 3.7 Volts, and the auxiliary output voltage can be adjusted by means of a shunt regulator. The extra power losses produced in such embodiments are not detrimental for the driver, since the power supplied at the auxiliary output is typically much lower than the power supplied at the main output.

FIGS. 5A, 5B and 6A, 6B described herein below illustrate two possible implementations of a linear regulator.

Figure 5A:
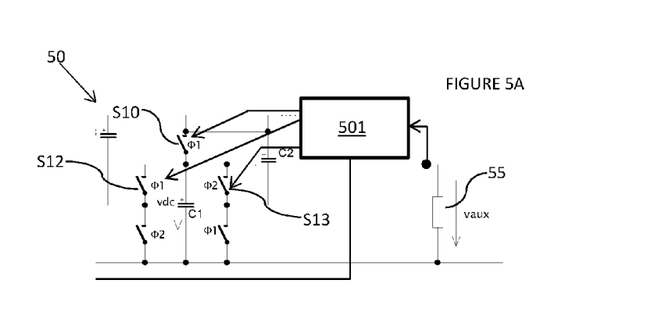
FIGS. 5A and 5B, electrical diagrams illustrating a regulator of the auxiliary output of a LED driver, according to an exemplary embodiment of the invention.

FIG. 5A shows an electrical diagram illustrating a regulator of the auxiliary output of a LED driver, according to an exemplary embodiment of the invention.

In an embodiment illustrated by FIG. 5A, the auxiliary output can be regulated by means of a linear regulator following a closed loop regulation scheme. In the illustrated exemplary embodiment, a driver 50, similar to the driver 30 described above in reference to FIG. 3, and for which only one part is illustrated in FIG. 5, can further comprise a regulation controller 501.

Figure 5B:
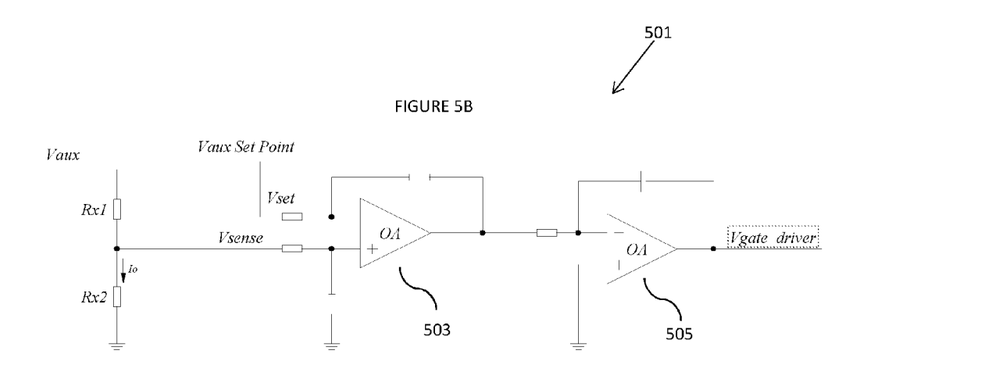

The regulation controller 501 can comprise an input that conveys a signal representing a sensed voltage across the auxiliary load 55. In the illustrated exemplary embodiment, the regulation controller 501 comprises three outputs that conveys control signals generated by the regulation controller 501, for controlling the switches that allow charging the DC node capacitor of the SCC forming the power converter 301, namely: the switches S10, S12 and S13 of the exemplary SCC as illustrated by FIG. 3. For instance, if the switches are formed by Metal Oxide Semiconductor (MOS) transistors, then the control signals can modulate the respective voltages at the gates of said switches S10, S12 and S13. As illustrated by FIG. 5B, the regulation controller 501 can be adapted to measure the auxiliary output voltage vaux, for example thanks to a voltage divider formed by two resistors Rx1, Rx2. The sensed voltage designated as Vsense can be substracted from an auxiliary output voltage set point Vset.

A Proportional-Integral (PI) controller can be formed by an amplifier circuit 503 and an integrator circuit 505, for example based on Operational Amplifiers (OA). The PI controller allows minimizing the error between the two measured voltages Vsense and Vset; the response of the PI controller can be adjusted through modifying the characteristics of the passive components, i.e. the resistors and capacitors in the illustrated exemplary embodiment, connected to the OAs.

The output voltage, designated as Vgate_driver, of the PI controller can then be provided to the gates of the switches S10, S12, S13, for example formed by MOS Field Effect Transistors (MOSFETs), so as to provide the proper Vds drop in the MOSFETs.

Figure 6A:
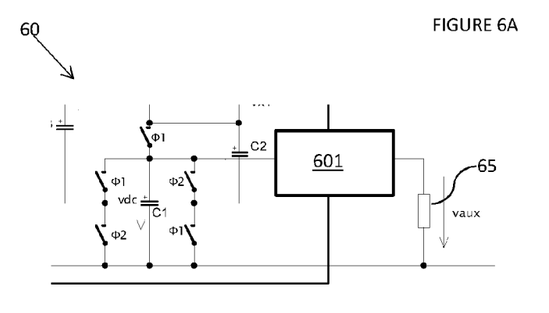
FIGS. 6A and 6B, electrical diagrams illustrating a regulator of the auxiliary output of a LED driver, according to another exemplary embodiment of the invention.
Figure 6B:
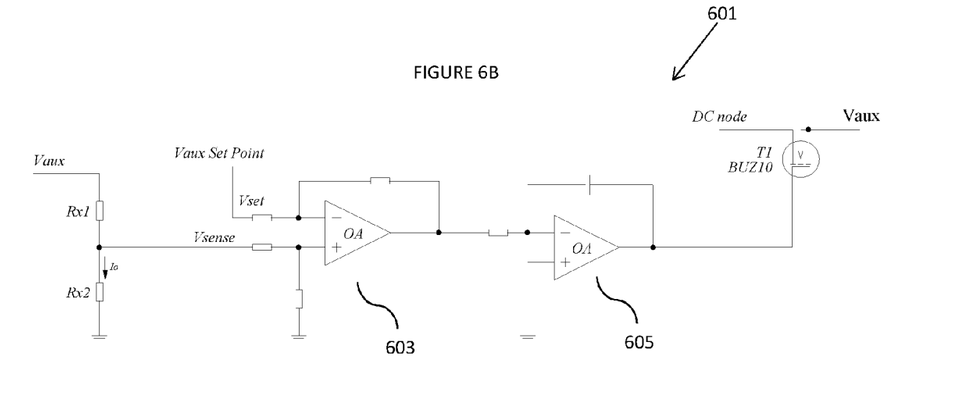

FIGS. 6A, 6B show electrical diagrams illustrating a regulator of the auxiliary output of a LED driver, according to another exemplary embodiment of the invention.

In an embodiment illustrated by FIG. 6A, the auxiliary output can be regulated by means of a linear regulator 601 that is connected in series between the DC node of the power converter 301 and the auxiliary load 65.

As illustrated by FIG. 6B, in a way similar to the architecture of the regulation controller 501 described above in reference to FIG. 5B, the linear regulator 601 can be adapted to measure the auxiliary output voltage vaux, for example thanks to a voltage divider formed by two resistors Rx1, Rx2. The sensed voltage designated as Vsense can be substracted from an auxiliary output voltage set point Vset.

A Proportional-Integral (PI) controller can be formed by an amplifier circuit 603 and an integrator circuit 605, for example based on Operational Amplifiers (OA). The PI controller allows minimizing the error between the two measured voltages Vsense and Vset; the response of the PI controller can be adjusted through modifying the characteristics of the passive components, i.e. the resistors and capacitors in the illustrated exemplary embodiment, connected to the OAs.

The output voltage of the PI controller can then be provided to the gate of a dedicated MOSFET switch T1.

All the switches used in the SCC architectures described herein can be unidirectional or bi-directional and implemented in a suitable technology that is compatible with the switching frequency of the circuit. For instance the switches can be formed by Metal Oxide Semiconductor Field Effect Transistors (MOSFET) or sets of MOSFETs on a silicon substrate or High Electron Mobility Transistors (HEMT) on a Gallium-Nitride substrate.

All the reactive elements can be sized small enough to enable integration, for example as a Power System on a Chip (PSoC) or Power System in a Package (PSiP).

The capacitors can also be implemented using a technology similar to that applied to Ferroelectric Random Access Memory (FRAM) or embedded Dynamic Random Access Memory (eDRAM). The higher dielectric constant achieved with such technologies makes the integrated SCCs smaller and thus cheaper.

All definitions, as defined and used herein, should be understood to control over dictionary definitions, definitions in documents incorporated by reference, and/or ordinary meanings of the defined terms.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed at limiting the scope.

The invention claimed is:

1. A driver for driving at least one main load and one auxiliary load, the driver comprising:
   a power converter adapted to convert a DC input voltage into at least one main output voltage provided through a main output for driving said main load, and at least one auxiliary output DC voltage through an auxiliary output for supplying said auxiliary load,
   a controller adapted to control the main output based on at least one input set point, wherein the power converter comprising a switched capacitor converter comprising a plurality of switches and a plurality of capacitors, the main output being connected to at least one internal node of the power converter, the auxiliary output being connected to a DC node of the power converter, and wherein the main output of the power converter conveys a floating voltage having a level that is a fraction of the input voltage level related to the conversion ratio, with a bias component split in a plurality of steps ranging from a determined lowest fraction level to a determined highest fraction level.

2. The driver as claimed in claim 1, wherein the power converter is configured for providing a plurality of output signals having a level that is a fraction of the input voltage level, each output signal being floating with a bias component split in a plurality of steps ranging from a determined lowest fraction level to a determined highest fraction level, the driver further comprising a selection module adapted to select one output signal among said plurality of output signals and to output such selected output signal.

3. The driver as claimed in claim 2, further comprising an output filter connected to the main output of the power converter.

4. The driver as claimed in claim 2, further comprising an output filter connected to the output of the selection module.

5. The driver as claimed in claim 1, wherein the power converter comprises a Switched Capacitor Converter, comprising a plurality of switches controlled by the controller.

6. The driver as claimed in claim 5, wherein the power converter is based on at least one topology in the group consisting of Dickson ladder, standard ladder, Fibonacci, and series-parallel topologies.

7. The driver as claimed in claim 1, further comprising a regulation module coupled to auxiliary output for regulating the auxiliary output voltage.

8. The driver as claimed in claim 7, wherein the regulation module comprises a regulation controller comprising an input conveying a signal representing a sensed voltage across the auxiliary load, and at least one output conveying control signals for controlling the switches of the power converter that allow charging the DC node capacitor of the power converter, said control signals being generated by the regulation controller.

9. The driver as claimed in claim 8, wherein the regulation module comprising a linear regulator connected in series between the DC node of the power converter and the auxiliary load.

10. The driver as claimed in claim 1, wherein the controller comprises one main feedback input for receiving feedback signals representative of the operation of the main load, and/or one auxiliary feedback input for receiving feedback signals representative of the actual operation of the auxiliary load, the controller being adapted to adjust operating parameters of the power converter as a function of input set point values, and/or said feedback signals.

11. A lighting system comprising:
   a driver for driving at least one main load and one auxiliary load, the driver comprising:
      a power converter adapted to convert a DC input voltage into at least one main output voltage provided through a main output for driving said main load, and at least one auxiliary output DC voltage through an auxiliary output for supplying said auxiliary load,
      a controller adapted to control the main output based on at least one input set point,
      wherein the power converter comprising a switched capacitor converter comprising a plurality of switches and a plurality of capacitors, the main output being connected to at least one internal node of the power converter, the auxiliary output being connected to a DC node of the power converter, and wherein the main output of the power converter conveys a floating voltage having a level that is a fraction of the input voltage level related to the conversion ratio, with a bias component split in a plurality of steps ranging from a determined lowest fraction level to a determined highest fraction level,
   a main load and an auxiliary load,
   wherein the main load comprises at least one Light Emitting Device and the auxiliary load comprises at least one of a control unit, a communication unit and a sensor unit.

* * * * *